(12) United States Patent
Batts

(10) Patent No.: US 6,609,913 B1
(45) Date of Patent: Aug. 26, 2003

(54) EDUCATIONAL YOUTH FIREMAN HELMET

(76) Inventor: Felix M. Batts, 2004 Charleston St., Wilson, NC (US) 27893

( * ) Notice: Subject to any disclaimer, the term of this patent is extended or adjusted under 35 U.S.C. 154(b) by 0 days.

(21) Appl. No.: 10/195,038

(22) Filed: Jul. 15, 2002

Related U.S. Application Data

(60) Provisional application No. 60/380,430, filed on May 15, 2002.

(51) Int. Cl.[7] .................. G09B 19/00; G09B 25/00; A42B 3/00
(52) U.S. Cl. .................. 434/226; 434/399; 434/395; 2/5; 362/105; 362/106
(58) Field of Search .................. 362/105, 106; 2/5; 434/399, 395, 226

(56) References Cited

U.S. PATENT DOCUMENTS

| | | | | |
|---|---|---|---|---|
| 1,749,998 A | * | 3/1930 | Collins | 362/106 |
| 3,142,833 A | * | 7/1964 | Bosley et al. | 340/321 |
| 3,422,224 A | * | 1/1969 | Curran | 381/75 |
| 4,090,185 A | * | 5/1978 | Patty | 340/321 |
| 4,199,802 A | * | 4/1980 | Malm | 362/106 |
| D260,791 S | * | 9/1981 | Suda | D29/103 |
| 4,525,878 A | * | 7/1985 | Lowe, Jr. | 2/209.13 |
| 4,638,410 A | * | 1/1987 | Barker | 362/105 |
| 4,945,458 A | * | 7/1990 | Batts et al. | 362/106 |
| D326,924 S | * | 6/1992 | Carroll | D26/39 |
| 5,329,637 A | * | 7/1994 | Walker | 2/5 |
| 5,564,128 A | * | 10/1996 | Richardson | 2/422 |
| 6,157,298 A | * | 12/2000 | Garfinkel et al. | 340/479 |

* cited by examiner

Primary Examiner—Derris H. Banks
Assistant Examiner—Dmitry Suhol
(74) Attorney, Agent, or Firm—Mills Law Firm PLLC

(57) ABSTRACT

An educational youth fireman helmet includes a scaled replication of a working fireman's helmet and is provided with a pivoting face visor, a pair of headlights controllable by the wearer, and a selectable voice messaging system providing recorded messages relating to fire safety.

8 Claims, 7 Drawing Sheets

EDUCATIONAL YOUTH FIREMAN HELMET

RELATED APPLICATION

This application claims the benefit under 35 USC 121 of U.S. Provisional Application No. 60/380,430 filed on May 15, 2002 in the name of Felix Batts and entitled "Educational Youth Fireman Helmet".

FIELD OF THE INVENTION

The present invention relates to educational toys and, in particular, to a fireman's helmet for recreational and educational use by children.

BACKGROUND OF THE INVENTION

Although fire safety is taught to children in most schools, quite often many of the rules are not remembered when presented in the teacher-student type format.

With the loss of so many firemen in the Sep. 11, 2001 terrorist attack on the World Trade Center Twin Towers in New York, there has been an increased awareness among children as well as adults as to what firemen do. While always heroic figures to children, public safety officials, particularly firemen, are authoritative in their messages.

As in other educational pursuits, whenever learning can be made fun, such as playing games and the like, then the lessons will be longer remembered or even never forgotten.

SUMMARY OF THE INVENTION

The present invention provides a realistic fireman's helmet for youth equipped with features identifying with the fireman's attire for general recreational activities and an educational messaging system for teaching and reinforcing important lessons relating to fire safety. The helmet is a scaled replication of a fireman's helmet, complete with a pivoting clear safety visor and a two light vision system. A voice synthesizer carried in the helmet provides an instructive series of important fire safety lessons for the child. The helmet makes the rules of fire safety fun to learn by designating the child or youth as a junior fire marshal with a fireman's hat that can be adjusted to fit their head. When the student sees himself in the mirror wearing a functioning fireman's helmet including a functioning headlight system and face shield, the student becomes excited and will be in a learning frame of mind.

Accordingly, it is an object of the present invention to provide fireman's helmet for children that is realistic and instructive.

Another object of the invention is to provide a replicated fireman helmet having a messaging system for teaching a child fire safety lesson.

A further object of the invention is to provide an educational device in the form of a fireman's helmet, which may be worn for realistic fireman's play activities and provides educational messages for the wearer related to fire safety.

DESCRIPTION OF THE DRAWINGS

The above and other objects and advantages of the present invention will become apparent upon reading the following description of the preferred embodiments taken in conjunction with the accompanying drawings in which.

DESCRIPTION OF THE PREFERRED EMBODIMENTS

Figure 1:
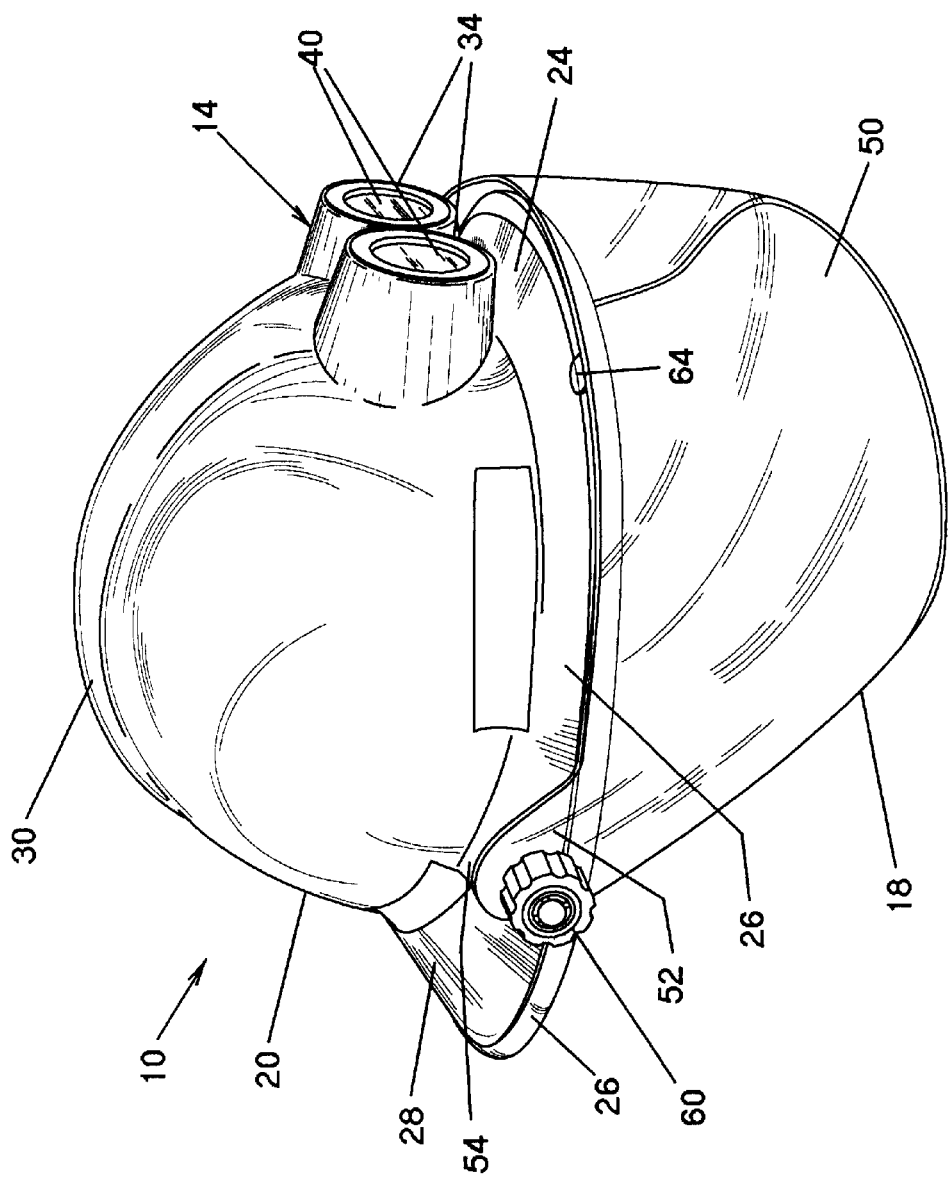
FIG. 1 is a perspective view of an educational youth fireman helmet of the present invention.
Figure 2:
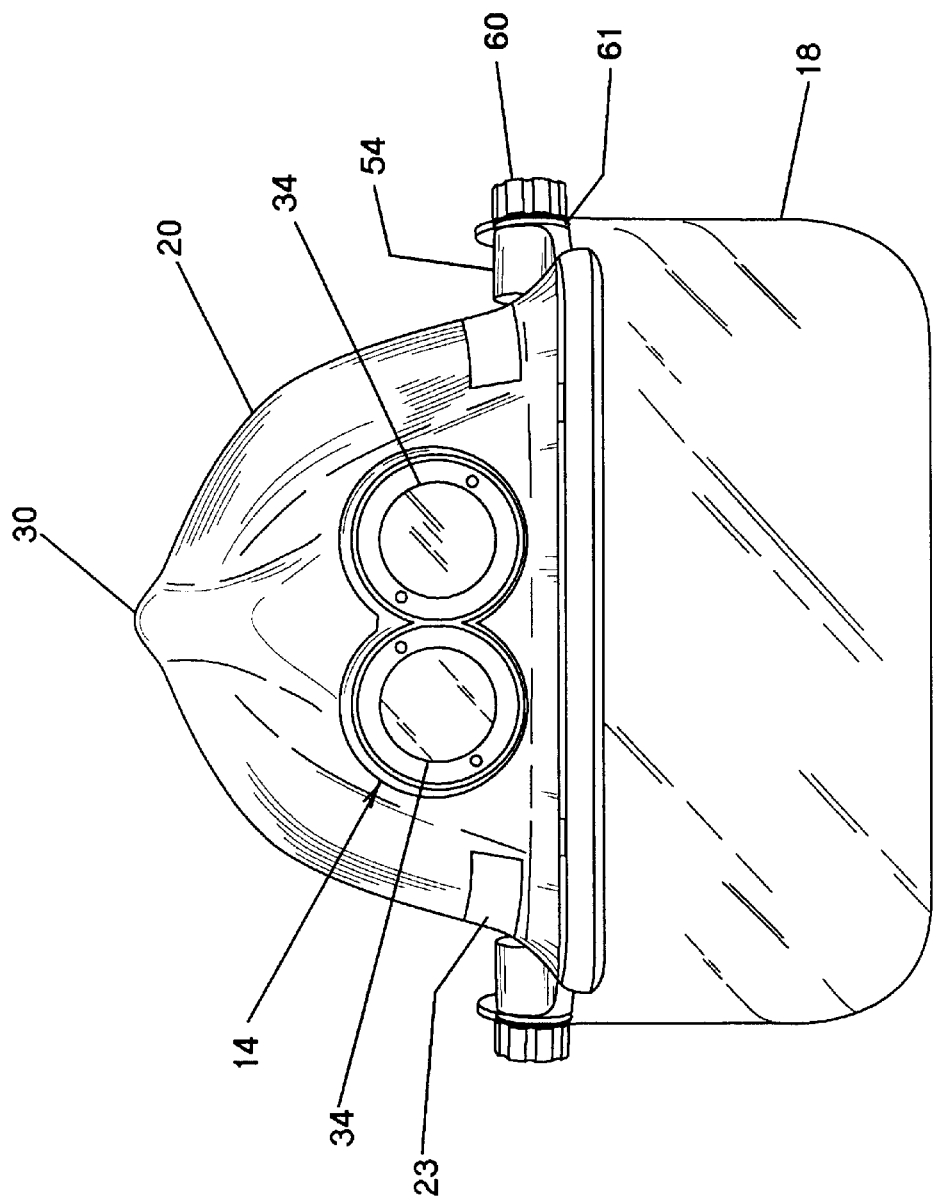
FIG. 2 is a front view of the helmet shown in FIG. 1.
Figure 3:
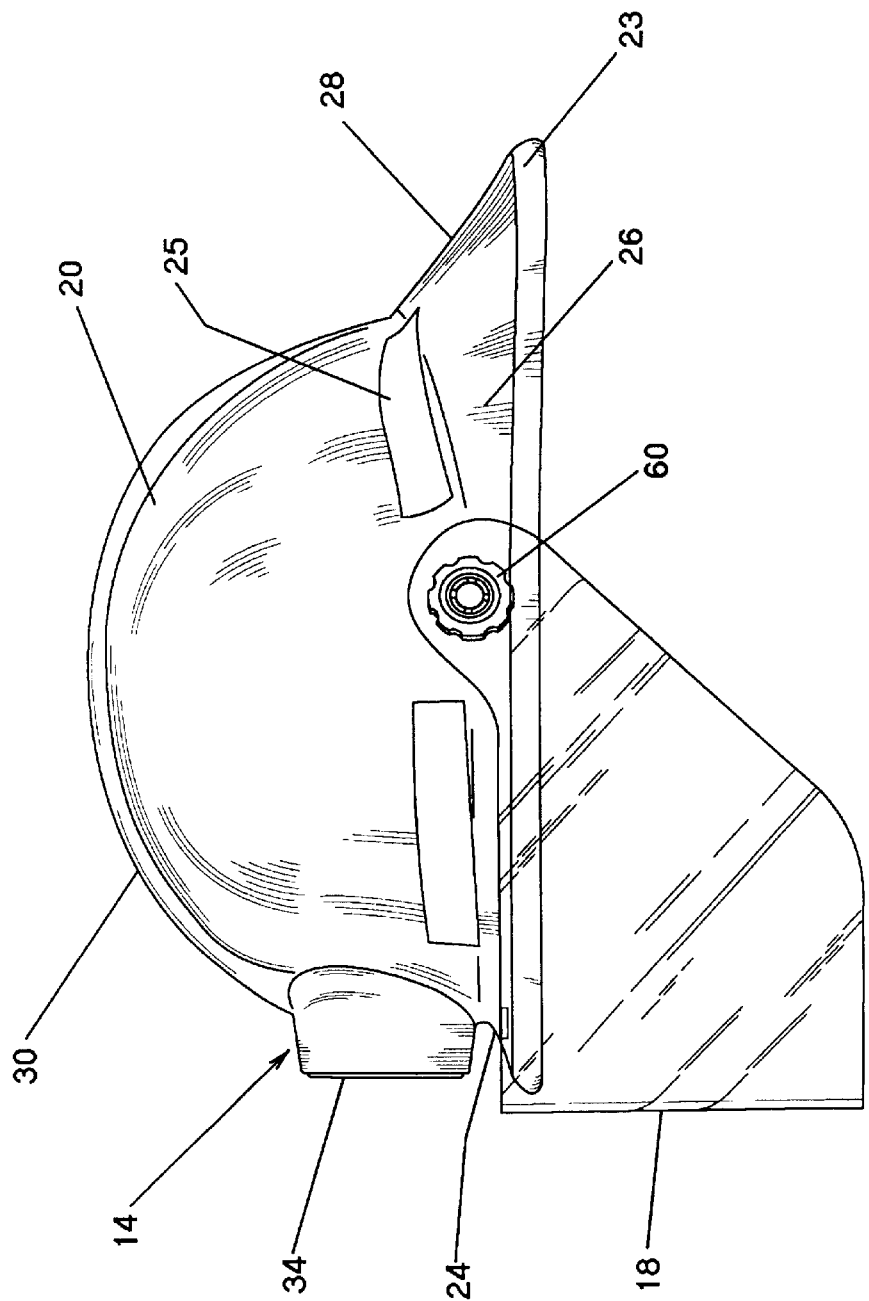
FIG. 3 is a side view of the helmet shown in FIG. 1.
Figure 4:
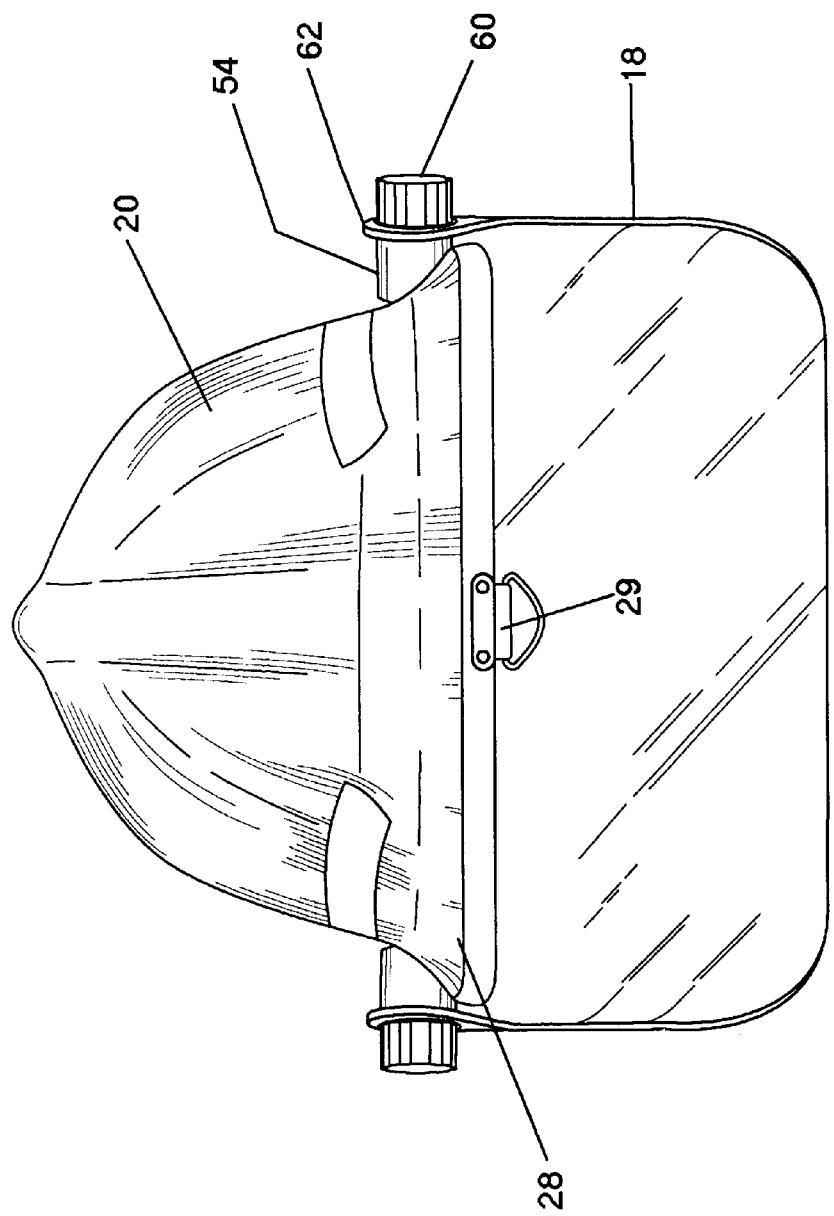
FIG. 4 is a rear view of the helmet shown in FIG. 1.
Figure 5:
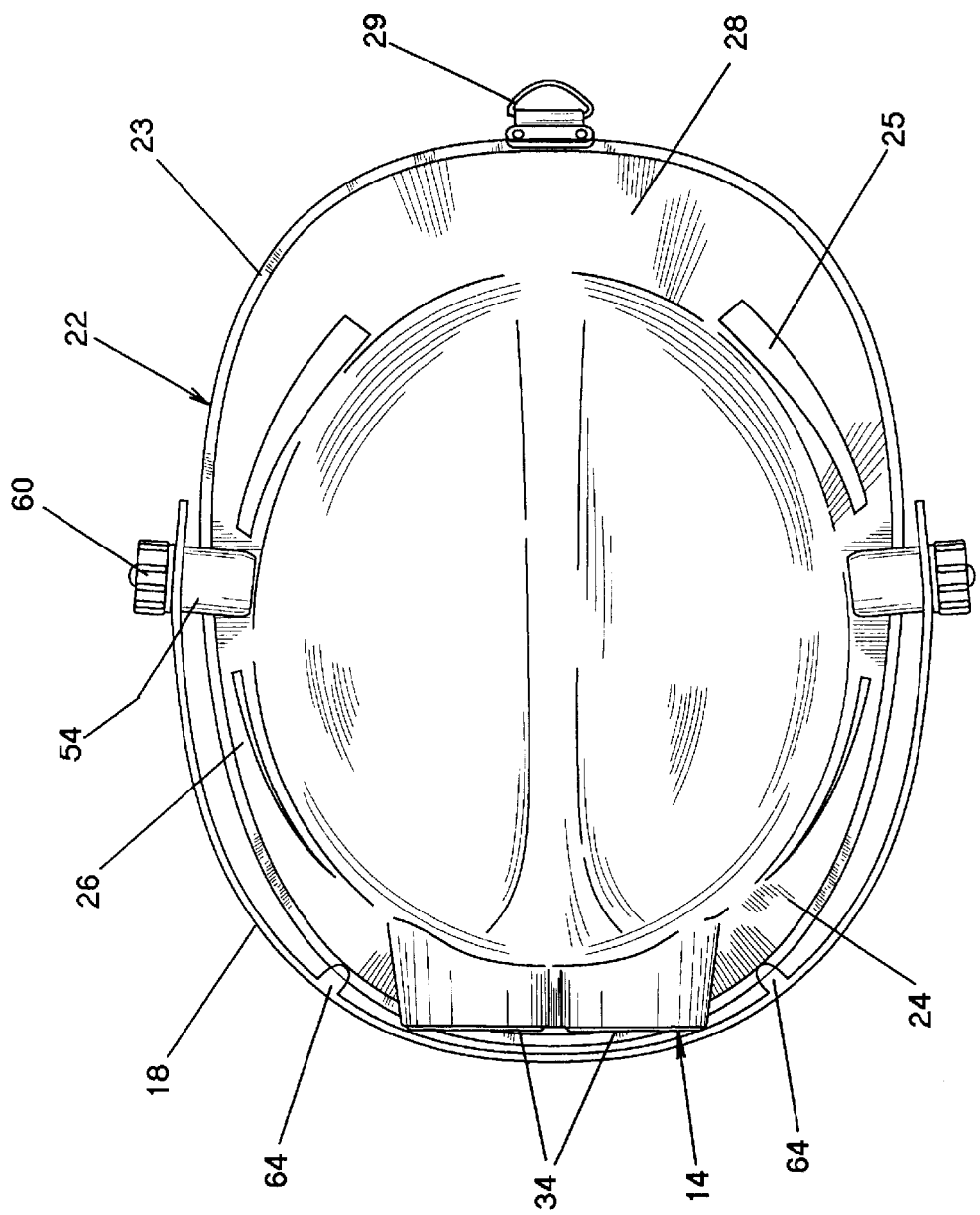
FIG. 5 is a top view of the helmet shown in FIG. 1.

Referring to the drawings for the purpose of describing a preferred embodiment of the invention and not for limiting same, FIGS. 1 through 6 show an educational youth fireman helmet 10, generally in a scaled replication of a firefighters helmet, suitable for educational and recreation use by children in the ages of about 6 to 12 years. The helmet 10 is provided with a twin headlight assembly 14 for illumination under the control of the child and a messaging system 16, FIG. 6, for presenting audible messages regarding fire safety. The helmet 10 carries a clear face visor 18 that may be rotated from the illustrated normal position in front of the face of the child and a raised position overlying the top of the helmet. The helmet 10 is formed of a relatively rigid molded plastic material. The visor 18 is formed of a clear plastic material.

The helmet 10 is a thin walled, molded construction exteriorally characterized by a dome shaped crown 20 surrounded by a slightly downwardly turned integral brim 22 carrying a peripheral rubber brim band 23. Typically, the crown 20 and brim 22 are yellow and the band a contrasting black. Indicia 23 in the form of stripes or legend may be placed in various locations on the exterior surfaces of the helmet.

The brim 22 has a relatively constant wide front section 24 and side sections 26 blending with a rear section 28 of greater width. A pivotable D-ring 19 is attached to the rear of the brim that allows the helmet to be hung on a hook when not in use.

The crown 20 includes a central medial projecting rib 30 extending longitudinally from the rear section 28 to the twin headlight assembly 14, which is positioned slightly above the front section 24 on the central front face of the crown 20.

The headlight assembly 14 includes a frontally projecting light housing 30 having a pair of frustoconical light pods 32. The light pods 32 have forwardly opening cavities carrying light units 34. Each light unit 34 includes a conventional reflector, a light bulb carried at the base of the reflector, and a circular frontal lens 40.

The visor 18 includes a constant width frontal section 50 surrounding the frontal section 24 of the brim 22 terminating with upwardly directed side tabs 52, which are pivotally connected to a mounting bracket 54 carried on the side sections 26 of the brim 16 and adjustably compressively held in desired rotation thereat by an adjusting knob 60 and washer 62. By adjusting the knob 60, the visor 18 can be selectively controlled in movement between positions. A pair of inwardly projecting tabs 64 are attached to the upper rear surface of the frontal section 50 of the visor 18 and engage the upper surface of the brim 22 to limit downward rotation of the visor 18.

Figure 6:
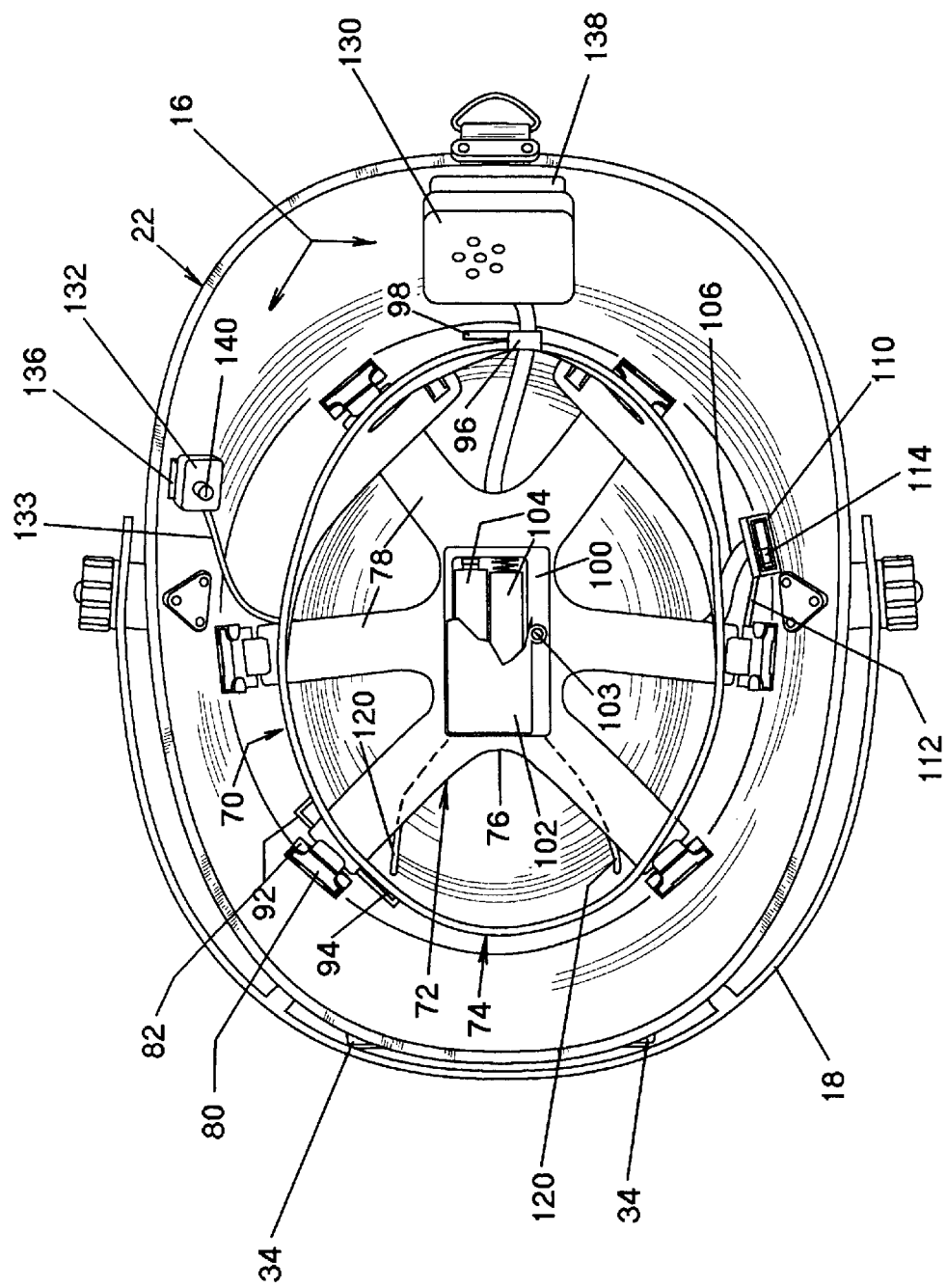
FIG. 6 is a bottom view of the helmet shown in FIG. 1.

Referring to FIG. 6, the inner surfaces of the crown 20 and the brim 22 define a downwardly opening head cavity for the child and include a head support harness 70 for adjustably conformably positioning the helmet on the head of the child during educational and recreational use. The support harness 70 includes a webbed head cap 72 and an adjustable head band 74. The cap 72 includes a central generally rectangular base 76 having a plurality of peripherally disposed, outwardly and downwardly extending arms 78. The arms 78 distally terminate with end tabs 80 that are received and secured within slotted brackets 82 formed integrally with the inner surface of the crown 20 adjacent the brim 22.

The head band 74 includes an elongated collar 90 having bracket portions 92 provided with slots 94 for slidably receiving the arms 76 of the cap 70. One end of the collar 90 adjacent the rear section 28 of the brim 22 is provided with an integral buckle 96. The other end of the collar is provided with a belt end 98 inserted through the buckle 96 and providing an adjusting mechanism for conforming the collar 90 to the head size of the wearer.

The base 76 of the cap 72 includes a rectangular battery housing 100 defining a battery compartment covered by a battery lid 102 held in place by a threaded fastener. The compartment includes conventional terminals for AA batteries 104.

Figure 7:
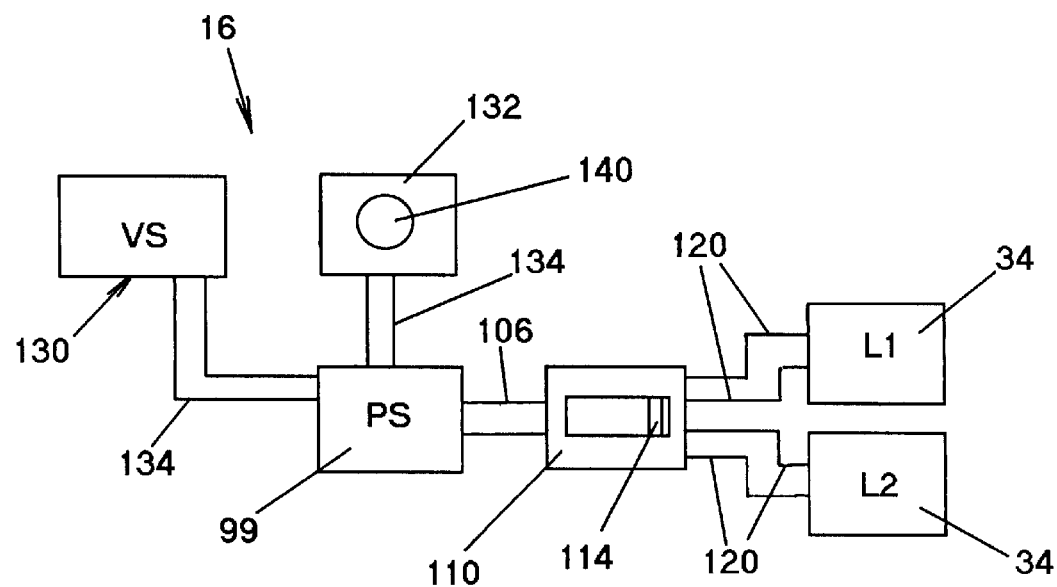
FIG. 7 is a schematic view of the lighting system and message system for the helmet.
Figure 8:
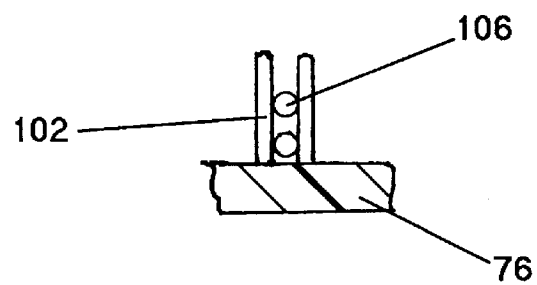
FIG. 8 is a fragmentary cross sectional view taken along line 8—8 ion FIG. 6 showing the guide lugs for routing the wires at the head harness.

Referring additionally to FIG. 7, a two-wire electrical cable 106 leads from the battery compartment along one of the side arms 76 to an on/off control switch 110 carried on an L-shaped side arm 112 located slightly to the rear of the mounting bracket 54 for the visor 18. The switch 106 includes a downwardly projecting switch arm 114 whereby the switch 110 can be conveniently activated during use between "on" and "off" positions. One of the wires of the cable 106 is connected with branch cables 120 leading along the front arms of the cap. The branch cables 120 are routed through an aperture in the crown registering with the light pods 34 and electrically connected in parallel to the light bulb of the respective light source. The two bulbs provide independent light sources that will allow one bulb to continue to work in case of failure of the other bulb. As shown in FIG. 8, the outwardly facing surfaces of the arms 76 are provided with spaced pins 102 for locating and retaining the cable 106/120 in assembly.

The messaging system 16 includes a commercially available self powered voice synthesizer 130 carried on the lower surface of the rear section 28 of the brim 14 that is operatively connected to a control switch 132 disposed at the side section 26 of the brim 22 opposite the switch 106 and interconnected by a two wire electrical cable 134. The switch 132 is releasably connected to the side section 26 by a hook and loop fastener 136. The synthesizer 130 is releasably connected to the rear section 28 by hook and loop fastener 138. The switch 132 includes a switch button 140 easily accessed for activation by or on behalf of the wearer.

Depressing the switch button 140 activates the voice synthesizer to sequentially repeat a prescribed message, such as for illustrative purposes the following:

(1) Hello Junior fire Marshal, let's have fun with fire safety.
(2) Here are 9 items you should never play with or touch—matches—lighter—heater—electrical outlet—fireplace—grill—radiator—candles—iron. Why? Because they all burn.
(3) What do you do when your clothes catch on fire? Don't run. Stop, drop and roll.
(4) What do you do when there is smoke in the house? Put one hand on the wall and crawl.
(5) Why do you crawl? Because smoke has poison gas in it.
(6) What happens if you breath the poison gas? You will surely pass out.
(7) If a door is hot, do you open it? No way! Feel the door with the back of your hand to see if it is hot.
(8) If you can't get out through your bedroom door, how do you get out? Through the window.
(9) What if your window is high above the ground, what do you need? You need a rope or ladder.
(10) When you get out, do you go back in? No way!
(11) Suppose your pet is still in the house, do you go back in for it? No! No! No!
(12) Well, if you don't go back into the house, where do you do? To a meeting place outside.
(13) Why do you go to the meeting place? To let everyone know that you are safe.

The message is repeated in its entirety whenever the button 130 is depressed beginning with the first statement.

The messages that are broadcast from the message module can be made to sound like the voice of a fireman. This will excite the youth using the helmet to listen to the messages over and over, which, along with the excitement of wearing a functioning fireman-type helmet will cause the youth to retain the messages which could be a lifetime memory which can be repeated to others to continue the learning process of fire safety.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed:

1. An educational fireman helmet for recreational and educational use by a child, said helmet comprising: a helmet member having a crown and a downwardly sloping peripheral brim having a front section, side sections and a rear section thereby replicating a safety helmet for a fireman, said crown defining a downwardly opening cavity; a head support harness member carried on an interior surface of said crown in said cavity for adjustable wearing on the head of the child, said support harness including a cap member for disposition on the head of the child having a central base with a plurality of outwardly extending arms connected at distal end to the interior surface of said crown, said battery compartment being formed in said central base; a curved transparent visor having end pivotally connected at outer surfaces of said sections a moveable between a lowered position below said brim and overlying the face of the child and a raised position overlying said crown; a light housing carried on said crown adjacent said front section of said brim; pair of light units carried in said light housing and projecting illumination forwardly of said front section when illuminated; a battery compartment in said head support harness; battery members carried in said battery compartment; circuit means including first switch means carried on an interior surface of said side section of said brim for electrically connecting said battery members with said light units for providing said illumination, said circuit means including electrical wires interconnecting said first and second switch means and said light units with said battery members, said arms of said cap member having inwardly projecting, spaced pin members for receiving and routing said wires; a messaging system carried on said interior surface of said brim, said messaging system including a voice synthesizing device providing a plurality of voice messages related to fire safety, and second switch means for selectively operating said voice synthesizing device.

2. The educational youth helmet as recited in 1 including an adjustable headband slidably supported on said arms for providing a selective conforming fit to the head of said child.

3. The educational fireman helmet as recited in claim 1 wherein said light units are connected in parallel whereby illumination may be provided notwithstanding failure of one of said light units.

4. The educational youth fireman helmet as recited in claim 3 wherein said light housing includes a pair of laterally spaced cylindrical pods each carrying a reflector member including a light source and a lens member covering said reflector member.

5. The educational youth fireman helmet as recited claim 3 wherein said first switch means and said second switch means are located on opposite sides of said cavity.

6. The educational youth fireman helmet as recited in claim 1 wherein said voice synthesizing device is carried on an interior surface of said rear section of said brim.

7. The educational youth fireman helmet as recited in claim 5 wherein said second switch means and said voice synthesizing device are releasably mounted on said brim.

8. The educational youth fireman helmet as recited in claim 7 wherein said second switch means and said voice synthesizing device are releasably mounted on said brim with hook and loop fasteners.

* * * * *